US005584377A

United States Patent [19]
Lago

[11] Patent Number: 5,584,377
[45] Date of Patent: Dec. 17, 1996

[54] CHAIN CONVEYOR WITH IMPROVED GUIDE DEVICE

[75] Inventor: Leopoldo Lago, Cittadella, Italy

[73] Assignee: Tecno Pool S.P.A., Padova, Italy

[21] Appl. No.: 391,069

[22] Filed: Feb. 21, 1995

[30] Foreign Application Priority Data

Jul. 22, 1994 [IT] Italy .................................. MI94A1567

[51] Int. Cl.⁶ .................................................. B65G 15/62
[52] U.S. Cl. ........................................ 198/841; 198/860.1
[58] Field of Search .............................. 198/831, 836.1, 198/841, 860.1, 861.1, 728, 729, 837

[56] References Cited

U.S. PATENT DOCUMENTS

| 4,640,410 | 2/1987 | Palmaer et al. | 198/841 X |
|---|---|---|---|
| 4,993,540 | 2/1991 | Van Capelleveen | 198/831 X |
| 5,228,557 | 7/1993 | Lago | 198/778 |
| 5,314,059 | 5/1994 | Clopton | 198/860.1 |
| 5,454,467 | 10/1995 | Lago | 198/841 X |

FOREIGN PATENT DOCUMENTS

| 0544085 | 6/1993 | European Pat. Off. | |
|---|---|---|---|
| 4240664 | 6/1994 | Germany | 198/860.1 |
| 0243409 | 9/1990 | Japan | 198/860.1 |
| 2108459 | 5/1983 | United Kingdom | |

*Primary Examiner*—James R. Bidwell
*Attorney, Agent, or Firm*—Young & Thompson

[57] ABSTRACT

A chain conveyor comprising a conveyor belt having first and second lateral link chain and cross bars connecting the links of one chain to the corresponding links of the other chain. The conveyor belt is supported by the first and second lateral chains which slide along first and second longitudinal slide elements attached to the support structure of the conveyor. The first and second longitudinal slide elements are arranged below respective lateral chains of the belt and each has a flat surface of longitudinal sliding for the lower edges of the vertical links of the belt so as to allow the links to perform also transverse movements. First and second lateral support elements are also provided, each of which can be engaged by a facing engaging surface of the conveyor belt and is arranged distanced from the respective engaging surface of the belt in such a way as to allow the longitudinally sliding conveyor belt to perform also transverse movements.

11 Claims, 4 Drawing Sheets

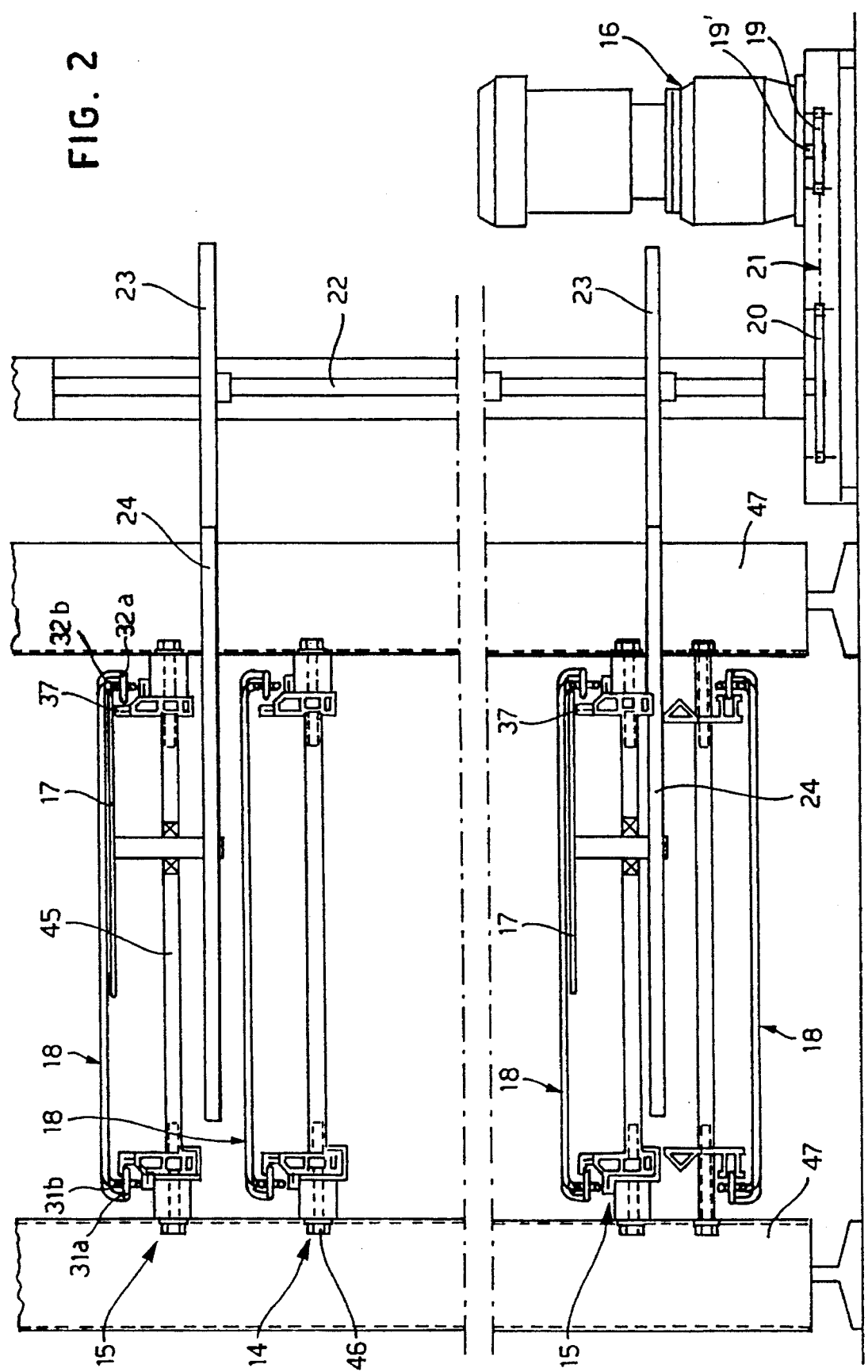

5,584,377

CHAIN CONVEYOR WITH IMPROVED GUIDE DEVICE

BACKGROUND OF THE INVENTION

The present invention relates to a chain conveyor comprising a conveyor belt having a first and a second lateral link chain each one formed by links arranged horizontally and alternating with links arranged vertically, and cross bars connecting the links of one chain to the corresponding links of the other chain, defining the belt conveying plane. Said conveyor belt is driven by belt drive means comprising at least one cogged wheel which engages with the links of one chain and is supported by means of said first and second lateral chains which slide longitudinally along respective first and second longitudinal support guides attached to the conveyor support structure.

In traditional chain conveyors of the type referred above the lateral chains were made to slide on the respective guides by means of horizontal links of the chains.

The longitudinal guides therefore comprised a contact and longitudinal sliding element arranged externally or internally to the chains on which the lower edges of the horizontal links of the chains rested. More specifically, the sliding contact between each chain and the corresponding guide was created by means of the lower edge of the semi-annular portions of the horizontal links projecting from the vertical links towards the exterior of the belt, or by means of the lower edge of the semi-annular portion of the horizontal link projecting from the vertical link towards the inside of the belt respectively.

Such a way of guiding the belt was devised so that the longitudinal guide element, which supported with its upper horizontal face the horizontal links of the corresponding chain, was in direct contact, via its vertical lateral edge, also with the lateral edge of the vertical links of the chain, so as to prevent whatsoever lateral slipping of the belt which was conveyed in this way along a path which was maintained rigidly rectilinear or curved.

Such a guide system was found to be extremely disadvantageous in that in environments where the belt was subjected to heating, such as baking ovens, the expansion of the bars, which pushes the links of the chains outwards, forces guides to be used which support the internal side of the horizontal link. The use of guides on the external side would in fact cause the vertical links to engage against the lateral vertical edge of the guide with a considerable increase in friction. Vice versa, in environments where the system is subjected to cooling, such as refrigerator or freezer rooms, again in order to avoid excessive friction, the shortening of the bars forces the chains to be supported on the external side of the links.

Traditional chain conveyors therefore have limited flexibility of use, it being currently preferable, in order to avoid the disadvantages referred above, to have different guide systems according to whether the conveyor belt is to be used in environments where the system is subjected to heating or to cooling.

If we then take into account the fact that, the horizontal links resting on the guides only with the limited semi-annular portion which projects from the lateral edge of the vertical links, when the guide has not been assembled with good workmanship and for example the distances between opposite sections of the guides are excessive or when work is carried out in environments in which the thermal gradient is considerable and the contraction or expansion of the chain connection bars can be high, a chain may easily fall from the respective guide with derailment of the belt. In order to avoid this occurrence, further elements for lateral restraint of the chain are currently arranged on the side of the chain opposite that of the guide and indirect contact with the chain, these elements normally being assembled in a single part of plastic material with the same guide elements. This forms guide channels which surround a substantial part of the link of the chain which therefore has contacts in a plurality of points with a considerable increase in friction. Said guide channels also have a somewhat elaborate and complex shape and are therefore expensive to manufacture.

Another aspect which must be considered concerns the fact that manufacturing chains of the belt, which are elements with somewhat low manufacturing costs, is carried out approximately by using links which have in fact a certain difference in size one from the other. The integration of the links of one chain with the opposite and corresponding links of the other chain, by means of the cross bars, therefore means that the ends of the bars attached to the chains are not perfectly equidistant one from the other. As a result, in a wholly random and unforeseeable manner, some groups of bars have ends which are therefore closer together on one lateral chain than on the opposite one, while other groups of bars on the contrary have attachment ends which are instead closer together on the other lateral chain. This provides overall a winding course of the belt which, being trapped by the guides in order to move along a path which develops with perfectly rectilinear sections or perfectly curved sections, pushes or pulls the chains against one or the other guide of the chains increasing the friction between said chains and the respective guides.

The problems referred above of traditional guide systems are made even more serious when using the chain conveyor in refrigerator rooms, where the accumulation of ice inside the channel provides further friction and impediments to the sliding of the chain in the channel. Greater friction and hence greater resistance to sliding is also provided by the mere presence of dirt inside the slideways.

The need has also been felt, in order to decrease as far as possible friction between guides and chains, to reduce the reciprocal contact surface which in traditional conveyors is formed at least by the lower faces of the semi-annular portions of the horizontal links.

The use of traditional guide systems in chain conveyors thus involves the need to use large quantities of lubricant which could contaminate the products conveyed with serious disadvantages particularly if food products are conveyed. Their use also involves excessive costs both due to the increased manufacturing cost inherent in the use of drive parts of increased power and as regards the operating costs due to the greater use of energy required for driving the belt as well as obviously due to the fact that excessive quantities of lubricant have to be used.

The object of the present invention is to provide a chain conveyor fitted with a new guide system which eliminates the disadvantages referred above presented by traditional chain conveyor guide systems.

More particularly the present invention sets out to provide a guide system for a chain conveyor which reduces to a minimum friction of sliding with said chains and which makes said conveyor suitable for being used in environments subjected either to heating or cooling and whereby the use of excessive quantities of lubricant and driving power can be avoided.

SUMMARY OF THE INVENTION

The previous objects are achieved by a chain conveyor which, according to what is disclosed in the characterising part of claim 1, has a first and a second longitudinal guide which are arranged below respective lateral chains of the belt and which each have a flat surface of longitudinal sliding for the lower edges of the vertical links of the belt, such as to allow said vertical links to perform also transverse movements, wherein a first and a second lateral support element are also provided, acting on the belt in a manner opposed one to the other, each one being engageable by a corresponding and facing engaging surface of the same conveyor belt. According to the invention each of said lateral support elements is positioned at a distance from the respective engaging surface of said belt in such a way as to allow said longitudinally sliding conveyor belt to perform also controlled movements in a transverse direction.

The dependent claims refer to particular and advantageous embodiments of the invention.

The present innovative idea is based on the theory that it is not in any way essential to guide the belt so that the latter moves along a path which develops with perfectly rectilinear or curved sections, without any possibility of transverse movement of the same. The fact of leaving the belt free to arrange itself along a moderately winding course, or to be able to widen or narrow freely in order to follow the thermal trends of the environment where the chain conveyor is used together with the fact that the resting of only the lower edge of the vertical links of the chains provides a definitely smaller contact surface than that provided by traditional conveyors, allows the resistance to longitudinal sliding present in known conveyors to be reduced considerably.

The features and advantages of the present invention will however be made clearer by reading the description which follows and which relates to preferred embodiments of the invention.

BRIEF DESCRIPTION OF THE DRAWINGS

The following description must be read with reference to the accompanying drawings in which:

FIG. 2 is a transverse section view of a part of the conveyor shown schematically in FIG. 1, in which the belt is guided with the guide system of the present invention;

PREFERRED EMBODIMENTS OF THE INVENTION

Figure 1:
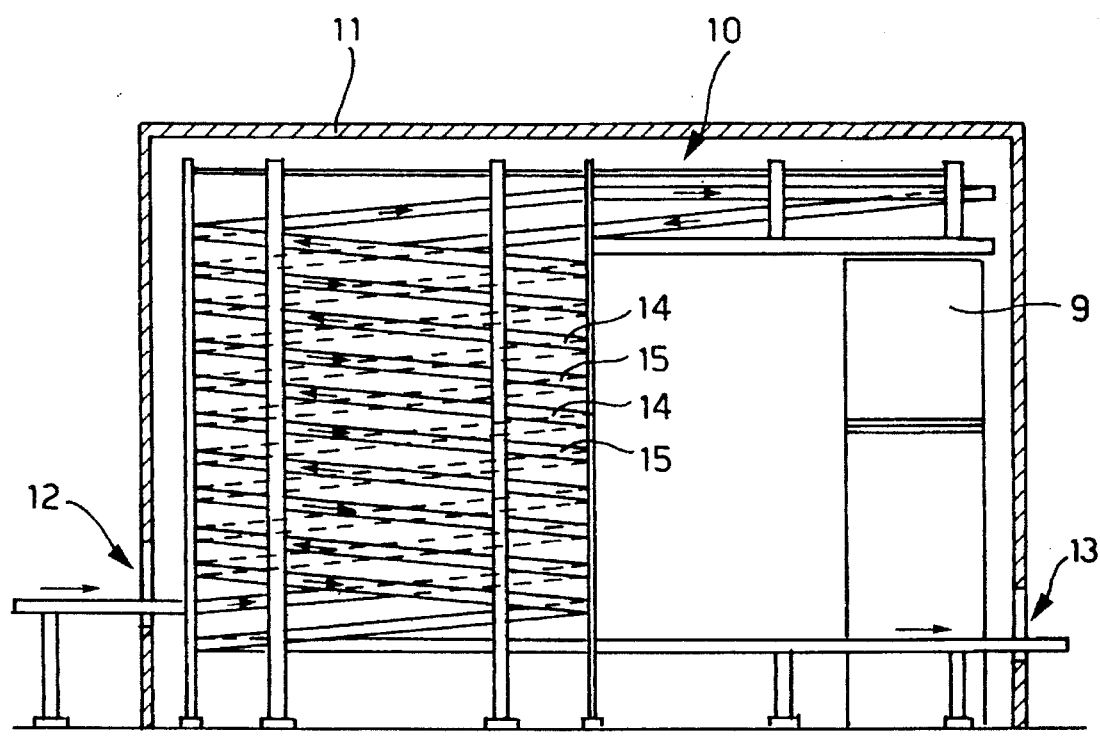
FIG. 1 is a lateral schematic view of a chain conveyor located inside a chamber for treating the material conveyed.

FIG. 1 shows a chain conveyor 10 inside a chamber 11 for treatment of the product conveyed which can be alternatively a room for freezing, cooking or of another type inside of which 9 denotes the heating or cooling system.

The conveyor belt develops spirally from an entrance 12 for the product towards an exit 13 arranged substantially at the same level or at a different level. The conveyor belt develops therefore with overlapping turns 14 and 15 belonging alternatively to the rising section and to the descending section respectively of the conveyor.

As shown in FIG. 2, the belt is driven by an electric motor 16 which drives horizontal wheels 17 located below the belt 18 to mesh with the vertical links of a chain. As is clear from this FIG. 2, the transmission device is composed of wheels or pulleys 19, 20 connected by means of a belt or chain 21, attached respectively to the shaft 19' of the motor and to a vertical shaft 22 for simultaneous transmission of motion to the various levels of the conveyor. In order to rotate with the shaft 22, wheels or pinions 23 are firmly connected thereto which mesh directly with wheels 24 whose axis is connected and drives said wheels 17 to rotate. It is obviously understood that any other suitable configuration of this drive device could be used.

Figure 3:
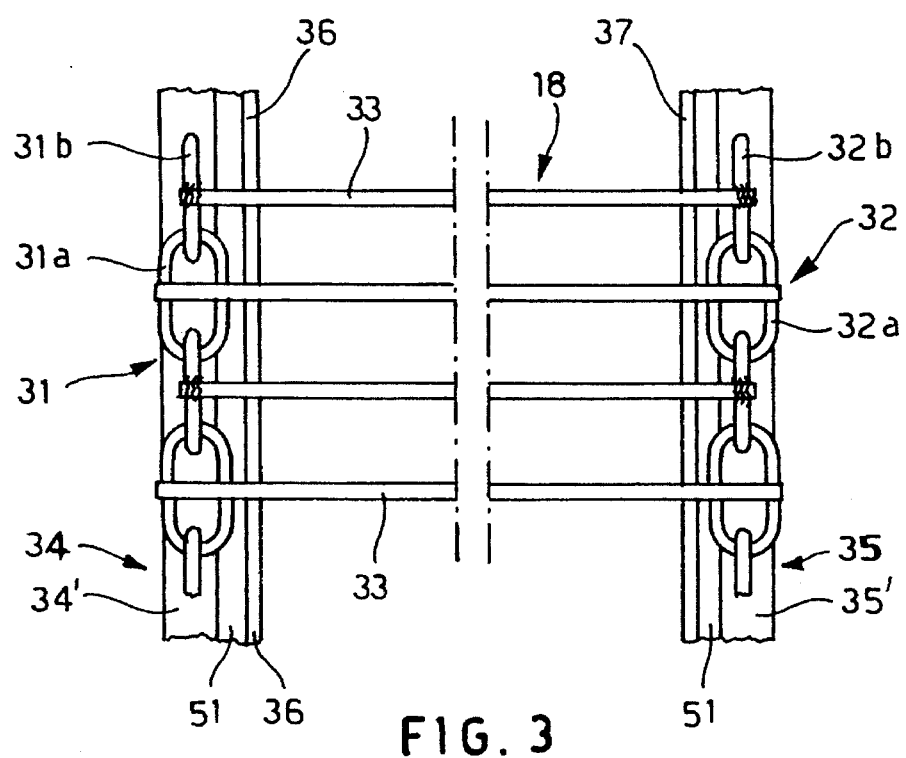
FIG. 3 is a plan view from above of the belt alone and of a first preferred embodiment of the guide system of the belt of the present invention.
Figure 4:
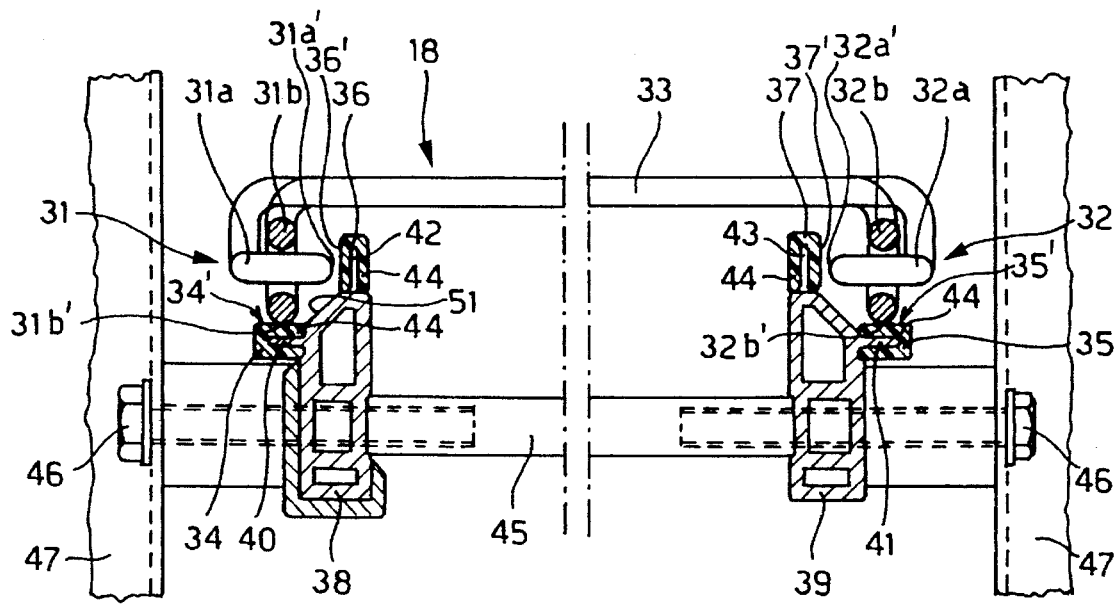
FIG. 4 is a view of a transverse section of the belt and of the first preferred embodiment of the guide system of the belt and of the relative support assembly.

Referring also to FIGS. 3 and 4, which show in greater detail both the conveyor belt 18 and a first preferred embodiment of the guide system of the belt according to the present invention, it can be seen how the conveyor belt 18 comprises a first and a second lateral chain 31 and 32 formed by respective horizontal and vertical links 31a, 31b and 32a, 32b respectively.

On the opposite links, both horizontal 31a, 31b or vertical 32a, 32b, of each chain are welded the ends, curving downwards, of cross bars 33 for connecting the chains defining with their upper surface the conveying surface of the belt 18.

The chain conveyor comprises a first and a second longitudinal guide suitable for guiding the sliding of said first and said second lateral chains 31, 32 respectively.

According to the invention, said first and second guides comprise a first and a second sliding element 34, 35 arranged below the respective chains 31, 32 and having a respective upper flat surface 34', 35' of resting and sliding for the lower edges 31b', 32b' of the vertical links 32a, 32b of the respective chains 31, 32 such as to allow said vertical links 31b, 32b, and the chains 31, 32 itself, to perform transverse movements.

According to the invention the guide system of the belt comprise also lateral support elements 36, 37 for the belt 18 provided to restrain excessive lateral slipping of the belt 18 itself and to prevent it from falling off the sides of the conveyor.

The elements for lateral support of the belt 36, 37 are arranged alongside the horizontal links 31a, 32a of said first and second chains 31, 32 of the conveyor belt respectively, and have a respective vertical surface 36', 37' suitable for engaging the lateral edges 31a', 32a' of the horizontal links 31a, 32a of the chains. According to the present invention the lateral support elements 36, 37 are positioned at a certain distance from said edges 31a', 32a' of the horizontal links 31a, 32a in such a way as to allow said longitudinally sliding conveyor belt 18 to perform also controlled transverse movements.

Preferably, as shown, both said support elements 36, 37 are arranged on the side of the horizontal links 31a, 32a turned towards the inside of the belt 18. Nevertheless they could also be provided on the external side of the horizontal links or both at a single chain of the belt on both sides of the latter.

Obviously, for the present invention, it is not strictly necessary for said lateral support elements 36, 37 to be engageable with the lateral edges 31a', 32a' of the horizontal links 31a, 32a of the chains 31, 32; they could also be engaged by any other longitudinal contact surface of the conveyor belt itself.

According to a further advantageous feature of the invention, as shown in FIG. 2, the horizontal wheels 17, which are shown here arranged inside the belt 18 between said chains 31, 32 but which could indifferently also be arranged outside of the belt 18, are arranged, in order to be able to insert their teeth in the vertical links 32b of the chain 32, between the upper edge of the lateral support element 37 and the plane defined by the cross bars 33 of the belt. If said horizontal wheels 17 were arranged outside of the belt, in the further eventuality of said lateral support elements also being arranged outside of the belt, said wheel would be arranged above the upper edge of the lateral support element.

Each of said lateral support elements 36, 37 and said slide elements 34, 35 is preferably formed with a plurality of longitudinal aligned strips which are arranged vertically and horizontally respectively. According to another advantageous feature of the present invention, said strips costituting said sliding and lateral support strips, have a rectangular cross section, are provided with the same configuration and the same dimensions so as to be totally interchangeable one with the other.

Figure 6:
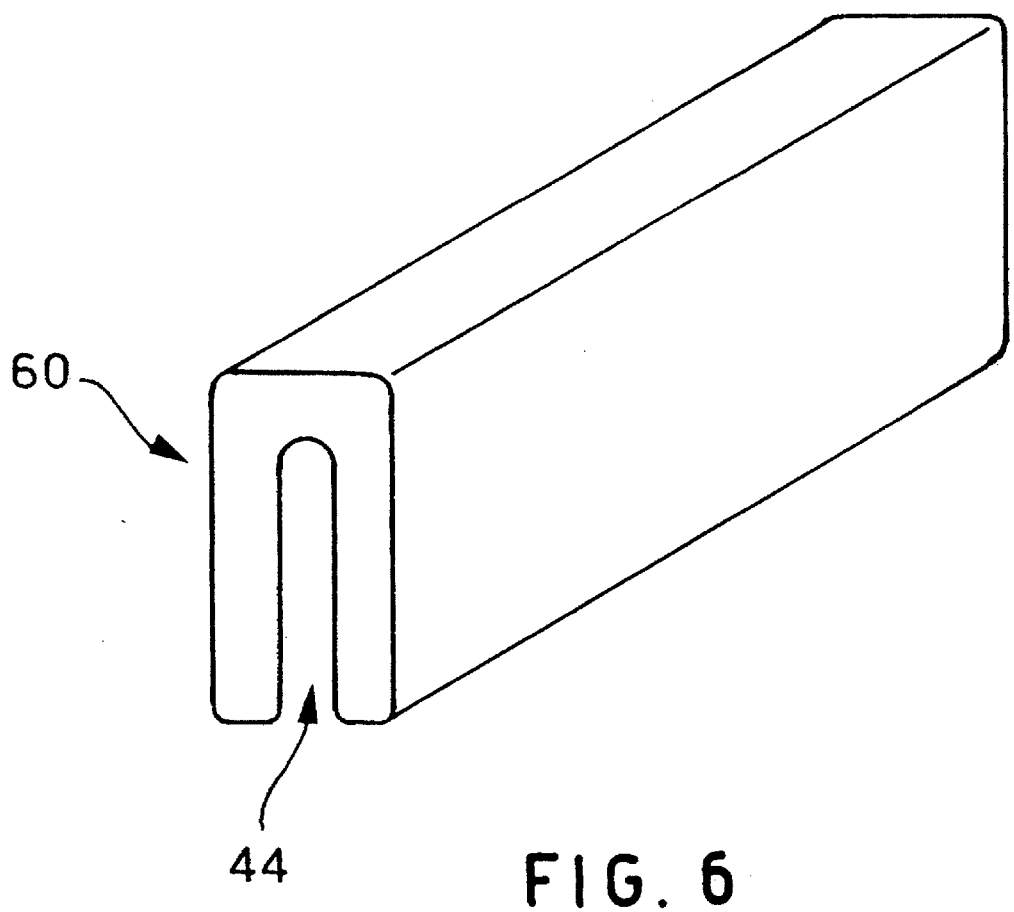
FIG. 6 is a perspective view of a longitudinal stripe constituting a preferred embodiment of the sliding and lateral support elements of the guides of the present invention.

As can be seen also with reference to FIG. 6, which shows a single strips designated by the numerical reference 60, in order to encourage total interchangeability between the strips having the function of sliding and those having the function of lateral support, the strips are provided with longitudinal slots 44 and longitudinal section bars 38, 39 are provided, each one having a respective horizontal projection 40, 41 and a respective vertical projection 42, 43 on which said strips are inserted with their longitudinal slot 44, to define, if they are inserted on a horizontal projection, a sliding element or, if they are inserted on a vertical projection, a support element.

In this way a guide system structure is achieved which has considerable structural simplicity such that it allows, in addition to the aforementioned interchangeability of the lateral support elements used for lateral restraint of slipping of the belt and the sliding elements, also easy assembly of said sliding and support elements. It is in fact sufficient, in order to assemble the aforementioned elements, as referred previously, to insert the strips by means of their longitudinal slot 61 on the respective projections of the support section bar.

The support section bars 38, 39 have a multibox section from whose upper sides said vertical projections extend upwards for the support elements and from whose outer lateral sides said projections for the sliding elements extend horizontally. At the chain support side between the vertical projection and the horizontal one, the section bars have a bevelled edge 51 in order to avoid any braking contact of the section bars with the chains. The section bars 38, 39 are in turn supported by cross members 45 of the bearing structure positioned under the guides and attached by bolts 46 to the uprights 47 of the same structure.

Figure 5:
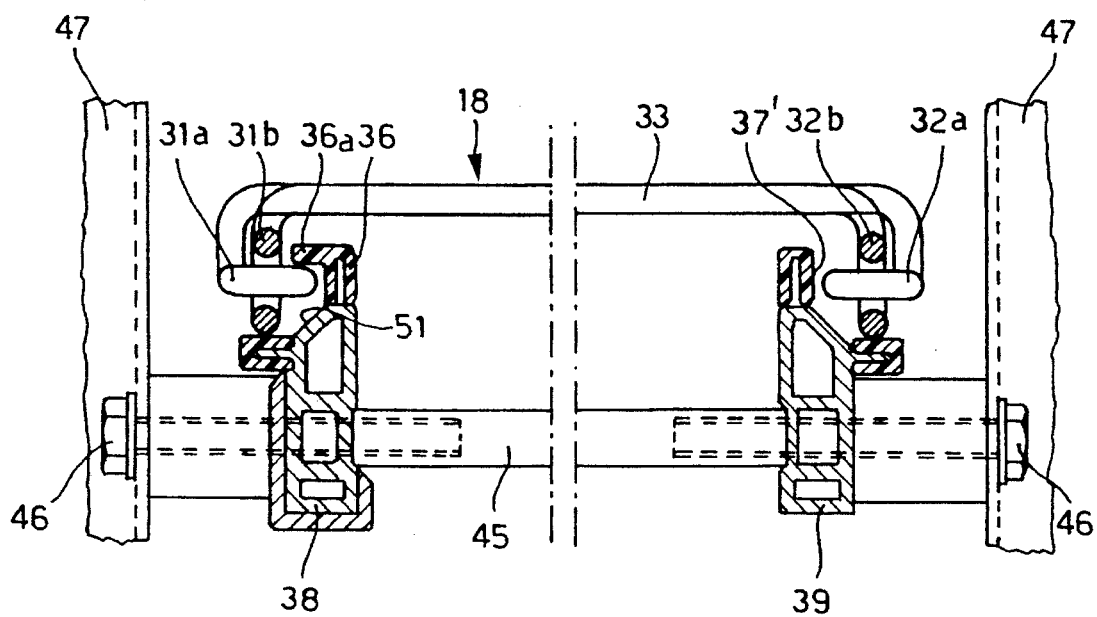
FIG. 5 is a view of a transverse section, similar to that of FIG. 4, showing a second preferred embodiment of the guide system of the belt of the present invention specially dedicated to curved sections of the path of the belt.

The strips 60 are preferably made in anti-friction plastic material. FIG. 5 shows a second preferred embodiment of the invention. This second embodiment differs from the first only due to the fact that one of the support elements, in this case the lateral support element 36, which extends upwards up to a height greater than that of the upper faces of the horizontal links, has a protuberance 36a, which extends horizontally from the upper margin of the strip 36 so as to be arranged above and near the upper faces of the horizontal links of the chains. This protuberance 36a is used advantageously to prevent any rising of the belt which could occur in the curved sections of the belt.

It is obviously understood that what has been written and shown with reference to the preferred embodiments of the invention has been given purely by way of a non-limiting example of the principle claimed.

What is claimed is:

1. A chain conveyor comprising a conveyor belt having a first and a second lateral link chains each of which has respective links arranged horizontally and alternating with links arranged vertically and having cross bars connecting the links of one chain to corresponding links of the other chain, which define the conveying surface of the conveying belt, said conveyor belt is driven by belt drive means comprising at least one cogged wheel engaging with the links of one chain and is supported by means of said first and second lateral chains which run longitudinally along respective first and second longitudinal guides attached to the conveyor support structure in which each of said first and second longitudinal guides comprises only a respective sliding element arranged below the respective lateral chain each having a flat surface for longitudinal sliding of the lower edges of the vertical links of the belt such as to allow the chains to perform also transverse movements, and in which the first and second longitudinal guides are provided with only a first and a second lateral support element provided acting laterally to the belt in an opposite way one to the other, in order to restrain its transverse movements, each of said first and second lateral support elements being engageable by a corresponding and facing engaging surface of the conveyor belt itself and positioned at a distance from the respective engaging surface of said belt in such a way as to allow said longitudinally sliding conveyor belt to perform also transverse movements, said sliding elements and said first and second lateral support elements constituting the only guide and support surfaces contacting said chains over at least a portion of the path of said chains.

2. A chain conveyor according to claim 1, in which each of said first and second lateral support elements is arranged alongside a respective chain of the conveyor and in that the respective engaging surfaces of said lateral supports of the belt consist of lateral edges of the horizontal links of the chains.

3. A chain conveyor according to claim 2, in which said first and second lateral support elements are arranged inside the belt and are engageable by the internal lateral edges of the horizontal links of the corresponding chain.

4. A chain conveyor according to claim 1, in which said sliding elements and said lateral support elements are in the form of longitudinal strips.

5. A chain conveyor according to claim 4, in which a first and a second section bar are provided, attached to the belt support structure (47), each section bar having a first vertical projection and a second horizontal projection; and in which said strips have a longitudinal slot for insertion on said horizontal and vertical projections respectively of said section bars to define said sliding elements and said lateral support elements respectively.

6. A chain conveyor according to claim 5, in which the strips defining respectively the sliding and lateral support elements have the same configuration and the same geometrical dimensions so as to be interchangeable one with the other.

7. A chain conveyor according to claim 4, in which said strips are made in anti-friction plastic material.

8. A chain conveyor according to claim 1, in which at least one of said lateral support elements comprises a horizontal extension which is arranged above and near the upper faces of the horizontal links of the corresponding chain to prevent any rising of the belt.

9. A chain conveyor according to claim 1 and wherein said cogged drive wheel is a horizontal wheel arranged below the plane defined by the cross bars of the belt which engages, for driving, its teeth with the vertical links of one of said chains of the belt and in which said horizontal cogged wheel is arranged above the lateral support element.

10. A chain conveyor comprising a conveyor belt having first and second lateral link chains, each of which has respective links arranged horizontally and alternating with links arranged vertically and having cross bars connecting the links of one chain to corresponding links of the other chain, and support and guide means for said chain conveyor, said support and guide means comprising a horizontal strip of low friction material on each side of the chain conveyor, each said horizontal strip contacting only the under surfaces of the vertically arranged links on the respective side of the conveyor, and vertically arranged strips of low friction material disposed one on each side of the conveyor and adapted to contact only one side of only said horizontal links of the conveyor, said strips constituting the only guide and support surfaces contacting said chains over at least a portion of the path of said chains.

11. A chain conveyor according to claim 10, wherein said strips are of low friction plastic.

* * * * *